United States Patent
Titus et al.

(10) Patent No.: US 11,945,517 B2
(45) Date of Patent: Apr. 2, 2024

(54) UNDERBODY PANEL WITH DIRECTED AIRFLOW

(71) Applicant: Ford Global Technologies, LLC, Dearborn, MI (US)

(72) Inventors: Matthew Arthur Titus, Livonia, MI (US); Jack Wiley Cooper, Novi, MI (US); Thomas Joseph Ciccone, Plymouth, MI (US); Erik Christensen, Ferndale, MI (US); Brett Clarke Peters, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/673,014

(22) Filed: Feb. 16, 2022

(65) Prior Publication Data

US 2023/0257039 A1 Aug. 17, 2023

(51) Int. Cl.
*B62D 35/02* (2006.01)
*B62D 21/02* (2006.01)
*B62D 21/11* (2006.01)

(52) U.S. Cl.
CPC .............. *B62D 35/02* (2013.01); *B62D 21/02* (2013.01); *B62D 21/11* (2013.01)

(58) Field of Classification Search
CPC .......... B62D 35/02; B62D 21/02; B62D 21/11
See application file for complete search history.

(56) References Cited

U.S. PATENT DOCUMENTS

| | | | |
|---|---|---|---|
| 9,937,781 B1 | 4/2018 | Bryer et al. | |
| 2002/0195842 A1* | 12/2002 | Kruschhausen | B62D 35/02 |
| | | | 296/204 |
| 2015/0021951 A1* | 1/2015 | Maurer | B60K 11/06 |
| | | | 296/180.1 |
| 2016/0361991 A1 | 12/2016 | Phan et al. | |
| 2017/0190364 A1* | 7/2017 | Fahland | B62D 37/02 |
| 2020/0047808 A1* | 2/2020 | Ajisaka | B62D 21/157 |
| 2020/0070895 A1* | 3/2020 | Greggs | B62D 25/2072 |
| 2022/0212730 A1* | 7/2022 | Moradnia | B62D 35/02 |

FOREIGN PATENT DOCUMENTS

| | | | |
|---|---|---|---|
| CN | 209972363 U | 1/2020 | |
| CN | 210027284 U | 2/2020 | |
| DE | 102014223332 A1 * | 5/2016 | ....... B60K 15/03006 |
| DE | 102020103196 A1 * | 8/2021 | |
| EP | 11860022 B1 | 11/2007 | |
| EP | 3261906 B1 * | 5/2019 | ............. B60K 11/06 |

OTHER PUBLICATIONS

DE-102020103196-A1 Machine English translation (Year: 2021).*
DE-102014223332-A1 Machine English translation (Year: 2016).*
EP-3261906-B1 Machine English translation (Year: 2019).*

* cited by examiner

*Primary Examiner* — Jason D Shanske
*Assistant Examiner* — Matthew James O'Neill
(74) *Attorney, Agent, or Firm* — Lorne Forsythe; Bejin Bieneman PLC

(57) ABSTRACT

An assembly for a vehicle includes a front subframe having two frame rails and a control arm connector on each frame rail. The assembly includes a panel supported on the frame rails and spaced vehicle-rearward of the control arm connector. The panel extends cross-vehicle from one of the frame rails to the other of the frame rails. The panel includes a channel elongated along the vehicle-longitudinal axis. The assembly includes a vehicle component spaced vehicle-rearward of the panel. The channel is aimed at the vehicle component.

16 Claims, 5 Drawing Sheets

UNDERBODY PANEL WITH DIRECTED AIRFLOW

BACKGROUND

A front of an underbody of a vehicle is between the rest of the vehicle and the road surface. The design of the underbody affects vehicle aerodynamics, which affects fuel economy, vehicle dynamics such as lift, etc. A vehicle may include structure on the front of an underbody of the vehicle to improve vehicle aerodynamics. The vehicle also includes vehicle components at the underbody and the vehicle design may use airflow along the underbody to cool these vehicle components when the vehicle is driven. These vehicle components may have decreased performance when operated above a certain temperature. The vehicle also includes structure at the underbody to increase structural rigidity of the vehicle, e.g., the body and/or frame of the vehicle.

Design of the underbody involves competing design considerations. As one example, aerodynamics of the underbody and cooling of vehicle components on the underbody can be competing design considerations. Specifically, improvements in aerodynamics of the underbody panel to reduce aerodynamic drag on the underbody can reduce or eliminate airflow across vehicle components located at the underbody. This can improve vehicle aerodynamics but also reduces cooling of the vehicle components at the underbody. As another example, the vehicle may include structure at the underbody to increase cross-vehicle rigidity of the vehicle, e.g. rigidity of a subframe of the vehicle. This structure can extend across the vehicle in a cross-vehicle direction and may interfere with airflow across the underbody thereby negatively affecting vehicle aerodynamics and/or interfering with cooling airflow.

DETAILED DESCRIPTION

Figure 1:
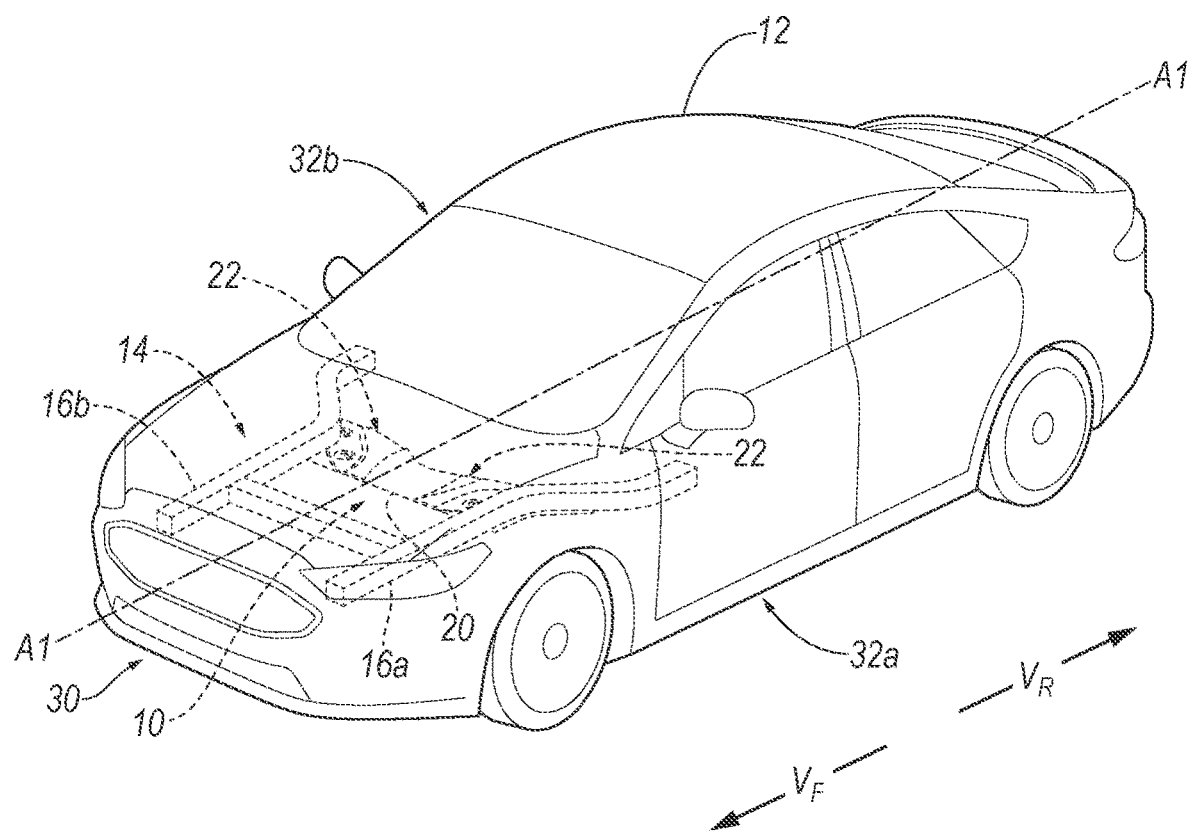
FIG. 1 is a perspective view of an assembly for a vehicle.
Figure 2:
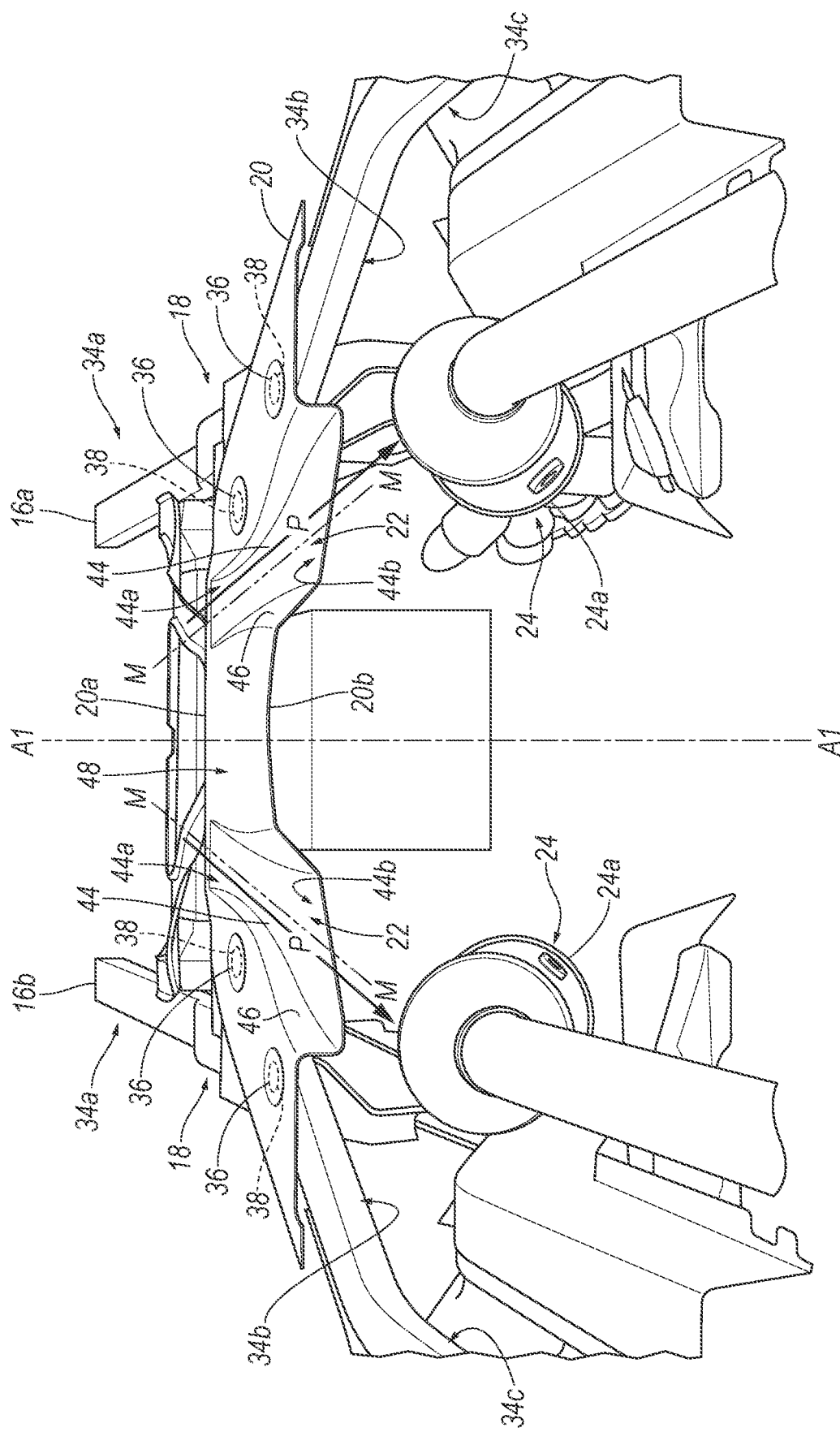
FIG. 2 is a perspective view of a panel supported on two frame rails.
Figure 3:
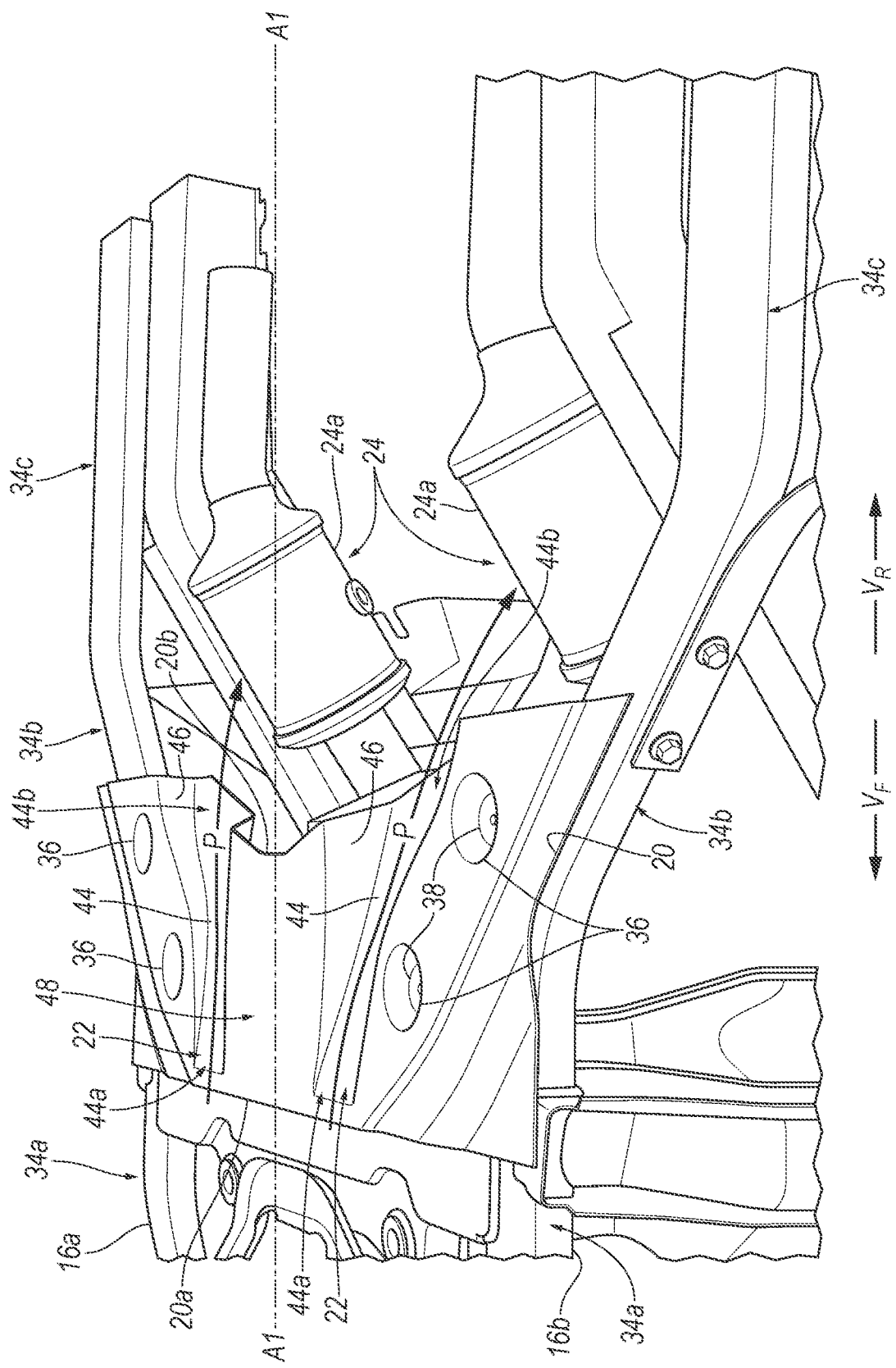
FIG. 3 is a perspective view of the panel supported on the two frame rails.
Figure 4:
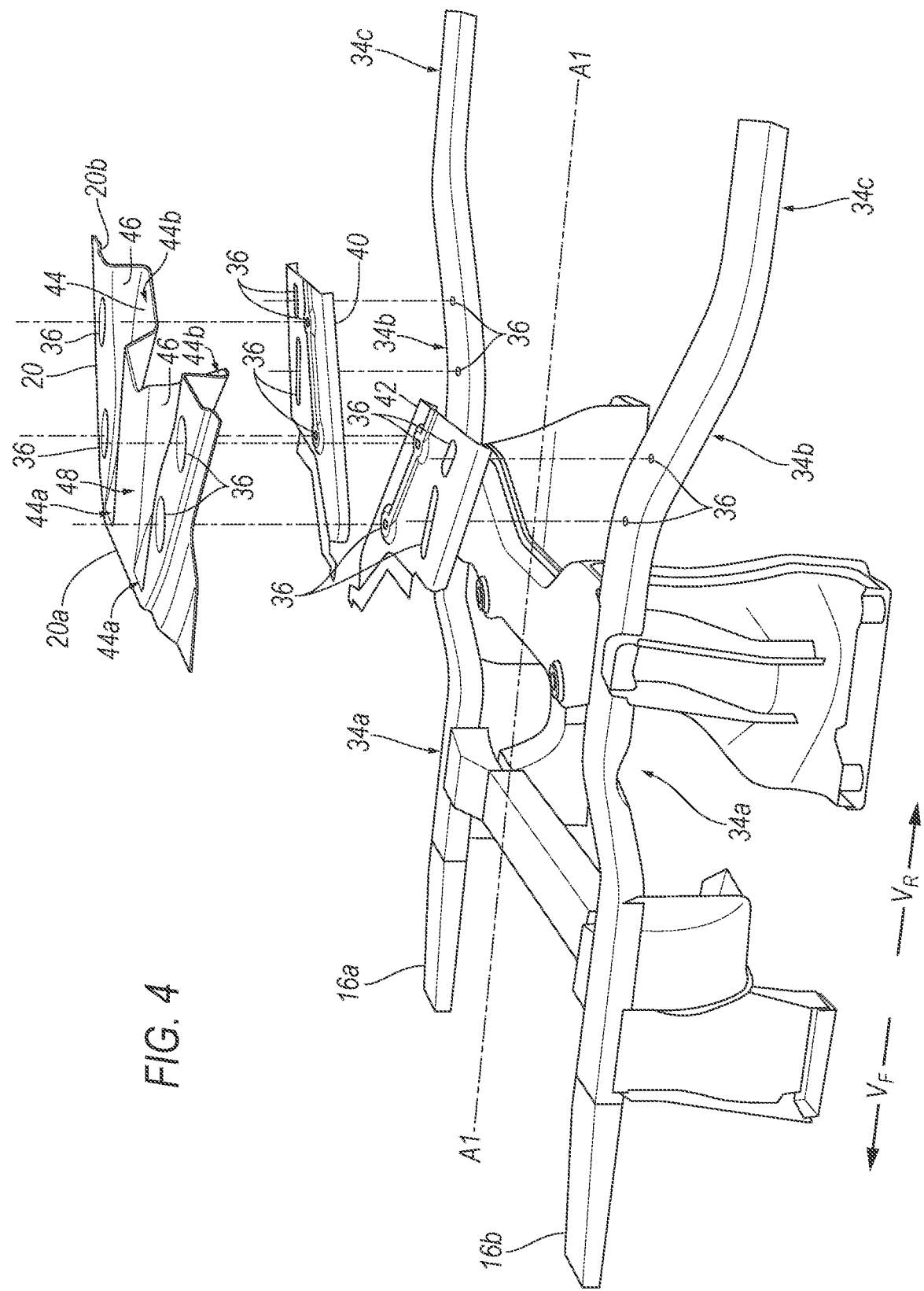
FIG. 4 is an exploded view of the assembly.
Figure 5:
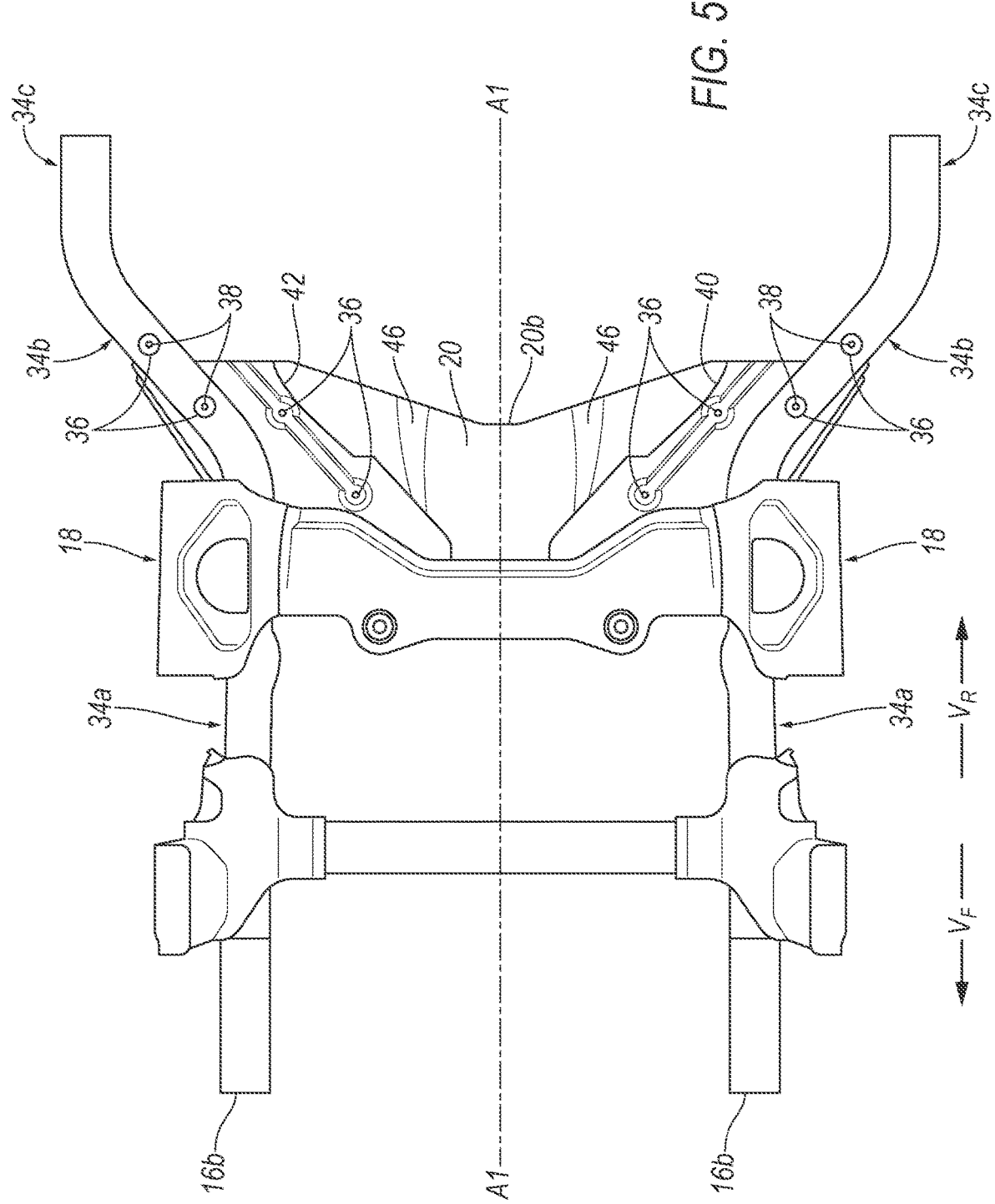
FIG. 5 is a top view of the assembly.

An assembly for a vehicle comprises a front subframe having two frame rails and a control arm connector on each frame rail. The assembly includes a panel supported on the frame rails and spaced vehicle-rearward of the control arm connector. The panel extends cross-vehicle from one of the frame rails to the other of the frame rails. The panel includes a channel elongated along the vehicle-longitudinal axis. The assembly includes a vehicle component spaced vehicle-rearward of the panel, the channel being aimed at the vehicle component.

The vehicle component may have a thermal performance requirement.

The channel may be designed to aim airflow at the vehicle component.

The vehicle component may be a catalytic converter.

The channel may define an airflow path, the vehicle component being on the airflow path.

The panel may fix the frame rails relative to each other cross-vehicle.

The two frame rails may diverge from each other vehicle-rearward of the control arm connector.

The panel may be designed to limit the lateral movement of the two frame rails vehicle-rearward of the control arm connector.

Each one of the frame rails may have a diverging portion diverging from the other of the frame rails, the panel being connected to the diverging portions.

The assembly may include a brace fixed to each of the frame rails vehicle-rearward of the control arm connector, the panel being supported on the braces.

The braces may be elongated along the frame rails.

The panel may be directly fixed to the braces.

The panel may include a second vehicle component and a second channel, the second channel being aimed at the second vehicle component.

The channel may include a flow surface and the panel includes a bottom surface, the flow surface being recessed relative to the bottom surface.

The panel may include a front end and a rear end, the flow surface angled upwardly from the front end to the rear end.

The flow surface may aim airflow at the vehicle component.

The frame rails may be elongated along the vehicle-longitudinal axis.

The assembly may include a vehicle body having a unibody construction, the front subframe being supported by the vehicle body.

An assembly 10 for a vehicle 12 includes a front subframe 14 having two frame rails 16a, 16b and a control arm connector 18 on each frame rail 16a, 16b. The assembly 10 includes a panel 20 supported on the frame rails 16a, 16b and spaced vehicle-rearward of the control arm connector 18. The panel 20 extends cross-vehicle from one of the frame rails 16a, 16b to the other of the frame rails 16a, 16b. The panel 20 includes a channel 22 elongated along the vehicle-longitudinal axis A1. The assembly 10 includes a vehicle component 24 spaced vehicle-rearward of the panel 20. The channel 22 is aimed at the vehicle component 24.

The panel 20 increases the structural rigidity of the front subframe 14 by resisting cross-vehicle movement of the frame rails 16a, 16b relative to each other. In other words, the panel 20 braces the frame rails 16a, 16b to provide lateral stability to the front subframe 14. During vehicle-forward motion, air from the environment is displaced around, over, and under the vehicle 12. As air is displaced under the vehicle 12, the air flows along the panel 20. Since the channel 22 is aimed at the vehicle component 24, the channel 22 directs air, i.e., aims the airflow, at the vehicle component 24. Air directed by the channel 22 at the vehicle component 24 cools the vehicle component 24. Accordingly, the panel 20 both reinforces the structural rigidity of the front subframe 14 and assists in temperature regulation of the vehicle component 24. As one example, the vehicle component 24 may be a catalytic converter 24a of an exhaust system of the vehicle 12 and the airflow aimed by panel 20 at the catalytic converter 24a reduces the temperature of the catalytic converter 24a, e.g., to an operating temperature at which the catalytic converter 24a efficiently operates. Other examples of the vehicle component 24 are described further below.

With reference to FIGS. 1, the vehicle 12 may be any type of passenger or commercial automobile such as a car, a truck, a sport utility vehicle, a crossover, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 includes a vehicle body (not numbered). The vehicle 12 may have a unibody architecture. Specifically, the vehicle body may be of a unibody construction in which the vehicle body is unitary with a vehicle frame, i.e., frame rails, rockers, pillars, roof rails, etc., are unitary. As another example, the vehicle body and vehicle frame may have a body-on-frame architecture, also referred to as a cab-on-frame architecture in which the vehicle body and vehicle frame are separate components, i.e., are modular, and the vehicle body is supported on and affixed to the vehicle frame. Alternatively, the vehicle body and vehicle frame may have any suitable construction. The vehicle body and vehicle frame may be of any suitable material, for example, steel, aluminum, and/or fiber-reinforced plastic, etc.

The vehicle body defines a passenger cabin (not numbered) to house occupants, if any, of the vehicle 12. The vehicle body may include a roof (not numbered) and a floor (not numbered) with the roof defining an upper boundary of the passenger cabin and the floor defining a lower boundary of the passenger cabin. The vehicle body includes doors openable to allow ingress to and egress from the passenger cabin.

The vehicle 12 includes a front subframe 14. The front subframe 14 supports other components of the vehicle 12, e.g., an engine, drivetrain, suspension, etc. The front subframe 14 may include beams, panels, etc. The front subframe 14 may be metal or any material of sufficient strength and rigidity. The front subframe 14 is a discrete, separate structure from the vehicle body. The front subframe 14 is supported by the vehicle body. Specifically, the front subframe 14 is connected to the vehicle body. For example, the front subframe 14 bolted to the vehicle body, fixed to the vehicle body with a bracket, a beam, etc. One or more dampeners, e.g., rubber bushings, springs, etc., may be disposed between the vehicle body and the front subframe 14. The front subframe 14 may be at the front 30 of the vehicle 12. For example, the front subframe 14 may be in front of the passenger cabin relative to the vehicle-longitudinal axis A1. The front subframe 14 may be a component of the unibody architecture, as described above.

The front subframe 14 includes the two frame rails 16a, 16b, namely the first frame rail 16a and the second frame rail 16b. The first frame rail 16a and the second frame rail 16b extend vehicle-rearward from a front 30 of the vehicle 12 to the vehicle body, e.g., to a location adjacent the passenger cabin. As shown in the Figures, the frame rails 16a, 16b, i.e., the first frame rail 16a and the second frame rail 16b, may be elongated along the vehicle-longitudinal axis A1, i.e., the longest dimension of the first frame rail 16a and the second frame rail 16b may be along the vehicle-longitudinal axis A1. The first frame rail 16a and the second frame rail 16b are spaced from each other cross-vehicle and may be aligned with each other along the vehicle-longitudinal axis A1. The vehicle 12 has a first side 32a and a second side 32b. The first frame rail 16a is disposed on the first side 32a and the second frame rail 16b is disposed on the second side 32b.

As set forth above, the front subframe 14 includes control arm connectors 18 on the first frame rail 16a and the second frame rail 16b, respectively. In other words, the front subframe 14 has at least one control arm connector 18 on the first frame rail 16a and at least one control arm connector 18 on the second frame rail 16b. The control arm connectors 18 are fixed to the first frame rail 16a and the second frame rail 16b, e.g., with fasteners 38, welding, etc. The control arm connector 18 supports, in part, a suspension system of the vehicle 12. Specifically, the control arm connector 18 may support a suspension component, e.g., a lower control arm. The suspension component may be, for example, pinned or fastened to the control arm connector 18. The suspension component, e.g., the lower control arm, is connected to other vehicle components, e.g., components of the suspension system. In such examples, the lower control arm is designed to stabilize the vehicle 12, e.g., the wheels, during motion of the vehicle 12. The lower control arm may be directly or indirectly connected to a wheel assembly at one end and may be directly or indirectly connected to the frame rails 16a, 16b at the control arm connectors 18. The panel 20, being connected to the first frame rail 16a and the second frame rail 16b, increases the structural rigidity of the front subframe 14 at least by transmitting forces from one frame rail 16a, 16b to the other frame rail 16a, 16b that result from force input at the control arm connector 18 during driving of the vehicle 12.

The first frame rail 16a and the second frame rail 16b diverge from each other vehicle-rearward of the control arm connector 18. Specifically, the first frame rail 16a and the second frame rail 16b may diverge from each other along the vehicle-longitudinal axis A1, e.g., in a generally horizontal plane. As an example, shown in the Figures, the first frame rail 16a and the second frame rail 16b may each include a front portion 34a, a rear portion 34c, and a diverging portion 34b between the front portion 34a and the rear portion 34c. The front portion 34a and the rear portion 34c may be straight. The diverging portion 34b extends vehicle-outward from the front portion 34a to the rear portion 34c. The diverging portion 34b may be straight and may connect to the front portion 34a and the rear portion 34c at curved joints, as shown in the example in the Figures. The diverging portions 34b may be vehicle-rearward of the control arm connectors 18. The panel 20 extends from the diverging portion 34b of the first frame rail 16a to the diverging portion 34b of the second frame rail 16b to provide lateral stability to the front subframe 14 at the diverging portions 34b. As shown in the example in the Figures, the panel 20 may also extend from the front portion 34a of the first frame rail 16a to the front portion 34a of the second frame rail 16b.

The first frame rail 16a and the second frame rail 16b the panel 20. The first frame rail 16a and the second frame rail 16b may each including mounting holes 36. Specifically, the mounting holes 36 may be on the diverging portion 34b and/or the front portion 34a of the frame rails 16a, 16b. The panel 20 may be fixed to the first frame rail 16a and the second frame rail 16b at the mounting holes 36. Specifically, the vehicle components 24 may be fixed to the first frame rail 16a and/or the second frame rail 16b by at least one fastener 38, as described further below. The mounting holes 36 in the first frame rail 16a and the second frame rail 16b are designed, e.g., sized and shaped, to receive the at least one fastener 38.

The front subframe 14, including the first frame rail 16a and the second frame rail 16b, may be of any suitable material, e.g., aluminum, steel, carbon reinforced composite, etc. The first frame rail 16a and the second frame rail 16b may be of any suitable shape, e.g., square tubing, round tubing, etc.

The panel 20 is supported on the front subframe 14. Specifically, the panel 20 is supported on the first frame rail 16a and the second frame rail 16b. As an example, shown in the Figures, the panel 20 is supported on the first frame rail 16a and the second frame rail 16b vehicle-rearward of the control arm connectors 18. In this example, the panel 20 is supported on the diverging portions 34b of the first frame rail 16a and the second frame rail 16b. Specifically, the panel 20 is connected to the diverging portions 34b.

The panel 20 may be supported on the first frame rail 16a and the second frame rail 16b directly or indirectly. Specifically, the panel 20 may have mounting holes 36. As an example, the mounting holes 36 of the panel 20 may be aligned with the mounting holes 36 of the first frame rail 16a and the second frame rail 16b. In such an example, the panel 20 may be directly supported on the first frame rail 16a and the second frame rail 16b. The panel 20 may be directly connected to the first frame rail 16a and the second frame rail 16b with fasteners 38, i.e., the fastener 38 is disposed in the mounting holes 36 of the panel 20 and the first frame rail 16a and the second frame rail 16b, thereby affixing the panel 20 to the first frame rail 16a and the second frame rail 16b. As shown in the Figures, the panel 20 is connected to the diverging portions 34b of the first frame rail 16a and the second frame rail 16b.

In examples where the panel 20 is supported on the first frame rail 16a and the second frame rail 16b indirectly, the vehicle 12 may include a first brace 40 and a second brace 42. As shown in the Figures, the first brace 40 is supported on the first frame rail 16a and the second brace 42 is supported on the second frame rail 16b. Specifically, the first brace 40 and the second brace 42 are supported on the first frame rail 16a and the second frame rail 16b vehicle-rearward of the control arm connector 18. The first brace 40 and the second brace 42 may be elongated along the frame rails 16a, 16b.

The first brace 40 and the second brace 42 may each have mounting holes 36. As an example, the mounting holes 36 of the first brace 40 may be aligned with the mounting holes 36 of the first frame rail 16a and the mounting holes 36 of the second brace 42 may be aligned with the mounting holes 36 of the second frame rail 16b. In such an example, the first brace 40 and the second brace 42 may have mounting holes 36 aligned with the mounting holes 36 of the panel 20. In this example, the first brace 40 and the second brace 42 are connected to the first frame rail 16a and the second frame rail 16b with, e.g., fasteners 38, to fix the first brace 40 and the second brace 42 to the first frame rail 16a and the second frame rail 16b, respectively. The panel 20 may be supported on the first brace 40 and the second brace 42. Specifically, the panel 20 may be directly fixed to the first brace 40 and the second brace 42 with, e.g., fasteners 38, to fix the panel 20 to the first brace 40 and the second brace 42, respectively. In other words, the panel 20 is indirectly supported on the first frame rail 16a and the second frame rail 16b.

The panel 20 extends cross-vehicle from the first side 32a of the vehicle 12 to the second side 32b of the vehicle 12. As an example, shown in the Figures, the panel 20 may extend between the first frame rail 16a and the second frame rail 16b, e.g., when the panel 20 is indirectly connected to the first frame rail 16a and the second frame rail 16b. As another example, the panel 20 may extend from the first frame rail 16a to the second frame rail 16b, e.g., when the panel 20 is directly connected to the first frame rail 16a and the second frame rail 16b.

The panel 20 includes a front end 20a and a rear end 20b. The front end 20a extends cross-vehicle from the first side 32a of the vehicle 12 to the second side 32b of the vehicle 12. The rear end 20b extends cross-vehicle from the first side 32a of the vehicle 12 to the second side 32b of the vehicle 12. As shown in the Figures, the panel 20 extends vehicle-rearwardly from the front end 20a to the rear end 20b. In other words, the front end 20a is spaced from the rear end 20b.

The panel 20 is designed to stiffen the first frame rail 16a and the second frame rail 16b. The panel 20 is designed to fix the first frame rail 16a and the second frame rail 16b relative to each other. Specifically, the panel 20 is designed to limit the lateral movement of the two frame rails 16a, 16b vehicle-rearward of the control arm connector 18. The panel 20 fixes the frame rails 16a, 16b relative to each other cross-vehicle. In other words, the panel 20 prevents relative movement of the frame rails 16a, 16b cross-vehicle in the areas of the frame rails 16a, 16b to which the panel 20 is connected. As an example, shown in the Figures, the panel 20 is connected to the diverging portions 34b of the first frame rail 16a and the second frame rail 16b. In this example, the panel 20 is designed to limit the lateral movement of the diverging portions 34b of the first frame rail 16a and the second frame rail 16b. In other words, the panel 20 is rigid relative to the two frame rails 16a, 16b to transmit forces from one of the rails 16a, 16b to the other of the rails 16a, 16b. For example, the panel 20 may transmit road vibration, suspension forces from one of the frame rails 16a, 16b to the other of the frame rails 16a, 16b, steering forces, shock and bounce from traveling on the road surface, forces received during vehicle impact, etc. The panel 20 may be, for example, plastic, aluminum or other metal, composite, composite reinforced fiberglass, etc.

The panel 20 includes at least one channel 22. The channel 22 includes a flow surface 44 and two sidewalls 46 spaced from and opposing each other. As shown in the Figures, the flow surface 44 extends between the two sidewalls 46. The flow surface 44 and the two sidewalls 46 are elongated from the front end 20a of the panel 20 to the rear end 20b of the panel 20, i.e., the channel 22 is elongated from the front end 20a of the panel 20 to the rear end 20b of the panel 20.

The panel 20 includes a bottom surface 48 that faces away from the vehicle body, i.e., that faces the road surface. The bottom surface 48 extends from the front end 20a to the rear end 20b and the first side 32a and the second side 32b. The channel 22 is recessed upwardly relative to the bottom surface 48. Specifically, the two sidewalls 46 extend upwardly from the bottom surface 48, i.e., toward the vehicle body, to the flow surface 44.

The channel 22 is aimed at the vehicle component 24. Specifically, the channel 22 defines an airflow path P and air flows along the airflow path P from the channel 22 to the vehicle component 24. Specifically, the flow surface 44 and the two sidewalls 46 define the airflow path P. As the vehicle 12 moves forward, air from the environment is directed around, above, and/or under the vehicle 12. As air flows under the vehicle 12, the air is directed into the channel 22 at the front end 20a of the panel 20 and is discharged from the channel 22 at the rear end 20b of the panel 20. When the air is discharged from the channel 22, the air moves along the airflow path P. As shown in the Figures, and described further below, the vehicle component 24 is on the airflow path P. In other words, air flowing in the airflow path P flows across the vehicle component 24 to exchange heat from the vehicle component 24 to the air in the airflow path P to cool the vehicle component 24.

As shown in the Figures, the channel 22 is flared at the rear end 20b of the panel 20. The channel 22 may include a midline M. The channel 22 diverges from the midline M at the rear end 20b of the panel 20. Specifically, the two sidewalls diverge from the midline M at the rear end 20b of the panel 20. As shown in the Figures, the channel 22 is angled upwardly at the rear end 20b of the panel 20. Specifically, the flow surface 44 is angled upwardly at the rear end 20b of the panel 20. As an example, the flow surface 44 may be angled upwardly from the front end 20a of the panel 20 to the rear end 20b of the panel 20. In such an example, the channel 22 may increase in depth toward the rear end 20b of the panel 20. In other words, the channel 22 may be deeper relative to the bottom surface 48 at the rear end 20b compared to the front end 20a. As another example, the flow surface 44 may be generally horizontal relative to the panel 20. As another example, the flow surface 44 may be generally horizontal relative to the panel 20 and may include an angled portion at the rear end 20b of the panel 20. In other words, the flow surface 44 may be generally horizontal for a first portion 44a and angled for a second portion 44b.

The panel 20 may include a plurality of channels 22 that aim airflow at a plurality of vehicle components 24, respectively. In the example shown in the Figures, the panel 20 includes two channels 22 (also referred to as a first channel 22 and a second channel 22). In that example, the vehicle 12 includes two catalytic converters 24a and one of the channels 22 is aimed at one of the catalytic converters 24a and the other of the channels 22 is aimed at the other of the catalytic converters 24a. In the example shown in the Figures, common numerals are used to identify common features of the two channels 22.

The vehicle component 24 may have a thermal performance requirement. Specifically, the vehicle component 24 may have improved performance below a threshold temperature. During operation the vehicle component 24 may generate heat and/or may be heated by operation of other equipment of the vehicle 12. Performance of the vehicle component 24 is improved when the temperature of the vehicle component 24 is below the threshold temperature. The airflow directed in the direction of the vehicle component 24 cools the vehicle component 24 to at least assist in the maintenance of the temperature of the vehicle component 24 below the threshold temperature during operation of the vehicle 12.

In the example shown in the Figures, the vehicle component 24 is a catalytic converter 24a. The catalytic converter 24a converts nitric oxide and carbon monoxide emissions in exhaust from a vehicle engine to carbon dioxide and molecular nitrogen, as is known. In other examples the vehicle component 24 may be any suitable vehicle component 24 having a thermal performance requirement. The vehicle component 24 may be, e.g., an electric motor, an electric vehicle battery, transmission, engine coolant line, etc. In any of these examples, the vehicle component 24 may have an external heatsink to draw heat from internal parts of the vehicle component 24. In such examples, the channel 22 aims the airflow at the external heatsink.

As described above, the vehicle component 24 is disposed vehicle-rearward of the panel 20. As shown in the Figures, the vehicle component 24 is between the first side 32a and the second side 32b of the vehicle 12. Specifically, the vehicle component 24 is between the first frame rail 16a and the second frame rail 16b. In the example shown in the Figures, the catalytic converter 24a is vehicle-rearward of the panel 20 and between the first frame rail 16a and the second frame rail 16b.

The vehicle component 24 is generally aligned with the channel 22. Specifically, the vehicle component 24 is aligned with the airflow path P. As described above, the channel 22 is designed to direct airflow in the direction of the vehicle component 24 to cool the vehicle component 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:
1. An assembly comprising:
a front subframe extending along a vehicle-longitudinal axis, the front subframe having two frame rails and a control arm connector on each frame rail;
the two frame rails diverging from each other vehicle-rearward of the respective control arm connector, each one of the frame rails has a diverging portion vehicle-rearward of the respective control arm connector and diverging from the other of the frame rails;
a panel supported on the frame rails and spaced vehicle-rearward of the control arm connector, the panel having a front end and a rear end spaced vehicle-rearward of the front end along the vehicle-longitudinal axis;
the panel extending cross-vehicle from one of the frame rails to the other of the frame rails;
the panel including a channel elongated along the vehicle-longitudinal axis;
a vehicle component spaced entirely from the panel vehicle-rearward of the panel along the longitudinal axis with a space along the vehicle-longitudinal axis between the entire vehicle component and the panel; and
the channel being designed to discharge airflow vehicle-rearward from the rear end of the panel along the vehicle-longitudinal axis across the space to the vehicle component; and
the panel being connected to the diverging portions and fixing the frame rails relative to each other cross-vehicle to prevent relative cross-vehicle movement of the frame rails at the diverging portions, the panel being designed to limit the lateral movement of the two frame rails vehicle-rearward of the control arm connector.

2. The assembly of claim 1, wherein the vehicle component has a thermal performance requirement.

3. The assembly of claim 1, wherein the vehicle component is a catalytic converter.

4. The assembly of claim 1, wherein the channel defines an airflow path, the vehicle component being on the airflow path.

5. The assembly of claim 1, further comprising a brace fixed to each of the frame rails vehicle-rearward of the control arm connector, the panel being supported on the braces.

6. The assembly of claim 5, wherein the braces are elongated along the frame rails.

7. The assembly of claim 5, wherein the panel is directly fixed to the braces.

8. The assembly of claim 1, wherein the panel includes a second vehicle component and a second channel, the second channel being aimed at the second vehicle component.

9. The assembly of claim 1, wherein the channel includes a flow surface and the panel includes a bottom surface, the flow surface being recessed relative to the bottom surface.

10. The assembly of claim 9, wherein the panel includes a front end and a rear end, the flow surface angled upwardly from the front end to the rear end.

11. The assembly of claim 9, wherein the flow surface aims airflow at the vehicle component.

12. The assembly of claim 1, wherein the frame rails are elongated along the vehicle-longitudinal axis.

13. The assembly of claim 1, further comprising a vehicle body having a unibody construction, the front subframe being supported by the vehicle body.

14. The assembly of claim 13, wherein the channel defines an airflow path, the panel being between the vehicle body and the airflow path.

15. The assembly of claim 1, wherein the vehicle component has a temperature and a threshold temperature, the channel being designed to maintain the temperature of the vehicle component below the threshold temperature during operation of a vehicle.

16. The assembly of claim 1, wherein the panel is rigid relative to the frame rails.

* * * * *